K. W. LINDMAN.
BALL BEARING.
APPLICATION FILED APR. 10, 1918.
1,332,444.
Patented Mar. 2, 1920.
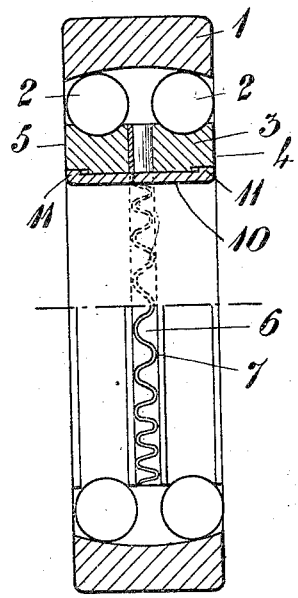
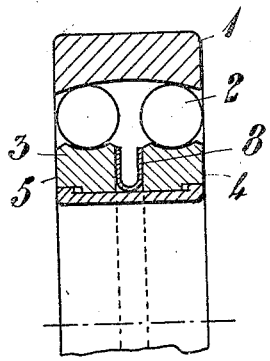
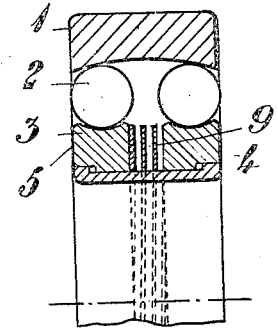
Inventor:
Konrad W. Lindman

UNITED STATES PATENT OFFICE.

KONRAD WERNER LINDMAN, OF STOCKHOLM, SWEDEN, ASSIGNOR, BY MESNE ASSIGN-MENTS, TO NORDISKA KULLAGER AKTIEBOLAGET, OF GOTTENBORG, SWEDEN, A LIMITED COMPANY OF SWEDEN.

BALL-BEARING.

1,332,444.　　　　Specification of Letters Patent.　　Patented Mar. 2, 1920.

Application filed April 10, 1918. Serial No. 227,620.

*To all whom it may concern:*

Be it known that I, KONRAD WERNER LINDMAN, subject of the King of Sweden, residing at Västra Trädgårdsgatan 4, Stockholm, in the Kingdom of Sweden, have invented certain new and useful Improvements in Ball-Bearings; and I do hereby declare the following to be a full, clear, and exact description of the invention, such as will enable others skilled in the art to which it appertains to make and use the same.

The present invention relates to a ball bearing having a plurality of rows of balls and an outer bearing member or ring having its inner face in the form of the equatorial zone of a sphere, with its center on the center line of the bearing, and an inner bearing member, which is composed of a plurality of rings, each provided with a groove constituting a ball path for one of the rows of balls.

In accordance with the present invention, there are arranged between the rings of the inner bearing member which are provided with ball-paths for the series of balls, yielding or elastic intermediate pieces, so that the said parts normally, by action of the elastic intermediate pieces, are held pressed outwardly, so that play between the balls and the rings is obviated, whereas in the case of strong axial pressure the elastic intermediate piece yields, so that sudden violent stresses on the bearing do not occur. By this arrangement of the elastic intermediate piece, an automatic adjustment of the bearing is also obtained.

In order to illustrate the invention there are shown, by way of example, three different forms, in axial section, of a ball bearing arranged in accordance with the present invention.

The invention is described first with reference to Figure 1. 1 designates the outer ring, which in a well-known manner is made in one piece with a spheroidal ball path, the center of which lies on the center line of the shaft or bearing. 2 designates the balls and 3 the inner ring, which, in accordance with the form illustrated in the drawing, is composed of two parts 4, 5, separate from each other, viewed axially, and provided with ball paths or grooves, between which parts there is a space. In this space there is arranged an intermediate piece consisting of yielding or elastic material, and made of any substance suitable for the purpose, for example, as indicated in Fig. 1, of corrugated metal plate 7 with parallel or radial corrugations, or else, as shown in Fig. 2, the intermediate piece may consist of a ring 8, U-shaped in cross section, or, as shown in Fig. 3, of a ring-shaped coiled spring 9. Obviously, a number of cylindrical coiled springs can also be arranged for the same purpose between the parts 4, 5, at a suitable distance from one another. In accordance with the form shown in the drawing, the parts of the inner ring are held together by a sleeve 10 passing through its central axial part, which sleeve is provided with projecting flanges 11, which grip the lateral pieces of the inner ring. Obviously also other elastic intermediate pieces than those which have been described above or illustrated in the drawing can be employed.

Having thus described my invention, I declare that what I claim is:—

1. A ball bearing comprising a plurality of rows of balls, an outer bearing member having its inner face in the form of the equatorial zone of a sphere, with its center on the center line of the bearing, an inner bearing member composed of a plurality of rings, each provided with a groove constituting a path for one of the rows of balls, and means between the rings for forcing them apart to bring the balls into contact with the outer bearing member.

2. A ball bearing comprising a plurality of rows of balls, an outer bearing member having its inner face in the form of the equatorial zone of a sphere, with its center on the center line of the bearing, an inner bearing member composed of a plurality of rings, each provided with a groove constituting a path for one of the rows of balls, and spring members between the rings for forcing them apart to bring the balls into contact with the outer bearing member.

3. A ball bearing comprising a plurality of rows of balls, an outer bearing member having its inner face in the form of the equatorial zone of the sphere, with its center on the center line of the bearing, an inner bearing member composed of a plurality of rings, each provided with a groove constituting a path for one of the rows of balls, and a ring member lying between the grooved rings and formed with corrugations constituting springs for forcing the grooved rings apart to bring the balls into contact with the outer bearing member.

4. A ball bearing comprising a plurality of rows of balls, an outer bearing member having its inner face in the form of the equatorial zone of a sphere, with its center on the center line of the bearing, an inner bearing member composed of a plurality of rings, each provided with a groove constituting a path for one of the rows of balls, means between the rings for forcing them apart to bring the balls into contact with the outer bearing member, and a cylindrical member within the inner bearing member, provided at its outer ends with flanges adapted to coöperate with the grooved rings at the ends of the bearing to limit the separation of the rings of the inner bearing member.

In testimony whereof I affix my signature.

KONRAD WERNER LINDMAN.

Witnesses:
 AUG. HAGELIN,
 ALMA PETTERSSON.